(12) United States Patent
Castalino et al.

(10) Patent No.: US 8,515,715 B2
(45) Date of Patent: Aug. 20, 2013

(54) METHOD, SYSTEM AND PROGRAM STORAGE DEVICE FOR SIMULATING ELECTRONIC DEVICE PERFORMANCE AS A FUNCTION OF PROCESS VARIATIONS

(75) Inventors: Pamela Castalino, Hopewell Junction, NY (US); Sudesh Saroop, Poughkeepsie, NY (US); Peter W. Schneider, Williston, VT (US); Joseph P. Walko, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 13/162,733

(22) Filed: Jun. 17, 2011

(65) Prior Publication Data

US 2012/0323548 A1    Dec. 20, 2012

(51) Int. Cl.
*G06F 17/50* (2006.01)
(52) U.S. Cl.
USPC ........ 703/2; 703/13; 706/13; 706/14; 706/60; 706/61
(58) Field of Classification Search
USPC ............... 703/2, 13; 706/13, 14; 716/113, 716/115, 136, 45, 60, 61
See application file for complete search history.

(56) References Cited

U.S. PATENT DOCUMENTS

| | | | |
|---|---|---|---|
| 5,319,564 A | 6/1994 | Smayling et al. | |
| 5,467,291 A * | 11/1995 | Fan et al. | 703/14 |
| 6,578,190 B2 | 6/2003 | Ferguson et al. | |
| 6,779,157 B2 | 8/2004 | Kondo | |
| 7,328,195 B2 * | 2/2008 | Willis | 706/14 |
| 7,350,183 B2 | 3/2008 | Cui et al. | |
| 7,353,157 B2 * | 4/2008 | Wasynczuk et al. | 703/14 |
| 7,376,472 B2 | 5/2008 | Wojsznis et al. | |
| 7,624,079 B2 * | 11/2009 | Hartman et al. | 706/16 |
| 7,640,143 B2 | 12/2009 | Bittner et al. | |
| 7,840,297 B1 | 11/2010 | Tuszynski | |
| 2003/0149962 A1 * | 8/2003 | Willis et al. | 717/135 |
| 2003/0154061 A1 * | 8/2003 | Willis | 703/4 |
| 2004/0148151 A1 | 7/2004 | Menter et al. | |
| 2007/0168057 A1 | 7/2007 | Blevins et al. | |
| 2010/0023308 A1 * | 1/2010 | Willis et al. | 703/13 |
| 2010/0106469 A1 | 4/2010 | Sheu et al. | |
| 2010/0262413 A1 | 10/2010 | Acar et al. | |

OTHER PUBLICATIONS

IBM, Technical Disclosure, Pre-Si Estimation and Compensation of SRAM Layout Deficiencies to Improve Design Yields, Dec. 11, 2007, IPCOM000161839D.
Morshed et al., "BSIM.4.6.4. MOSFET Model-User's Manual," p. 118, University of California, Berkeley, CA, 2009.

* cited by examiner

*Primary Examiner* — Thai Phan
(74) *Attorney, Agent, or Firm* — Gibb & Riley, LLC; Richard M. Kotulak, Esq.

(57) ABSTRACT

Disclosed are embodiments of a method, a system and a program storage device for simulating electronic device performance as a function of process variations. In these embodiments, functions of a primary model parameter for each of multiple secondary model parameters across multiple different process conditions can be determined based on a relatively small number of target sets of device characteristics. These functions can then be used to augment a simulator so that during subsequent simulations of the electronic device over a wide range of varying process conditions, a change in a value for the primary model parameter will automatically result in corresponding changes in values for the secondary model parameters. By augmenting the simulation environment in this manner, the disclosed embodiments efficiently provide more robust simulation results over prior art techniques.

20 Claims, 4 Drawing Sheets

METHOD, SYSTEM AND PROGRAM STORAGE DEVICE FOR SIMULATING ELECTRONIC DEVICE PERFORMANCE AS A FUNCTION OF PROCESS VARIATIONS

BACKGROUND

1. Field of the Invention

The disclosed embodiments relate to models for simulating electronic device performance and, more particularly, to method, system and program storage device for simulating electronic device performance as a function of process variations.

2. Description of the Related Art

Electronic devices (e.g., single semiconductor devices, cells comprising multiple semiconductor devices, or entire integrated circuits) of the same design will often differ due to process variations (i.e., variations due to non-uniform conditions during processing). Types of process variations include, but are not limited to, variations in dopant concentration, variations in diffusion depth, variations in dielectric layer thickness, etc. Such process variations will in turn result in variations in electronic device performance.

In order to ensure that an electronic device will achieve a given performance target when manufactured, designers often simulate performance using a compact device model. Those skilled in the art will recognize that a compact device model is a set of equations that describe how the particular electronic device will perform as a function of various model parameter values. Many compact device models (e.g., Berkeley Short-Channel IGFET Model (BSIM), which refers to a family of metal oxide field effect transistor (MOSFET) models) support Monte Carlo (MC) simulations. Typically, when Monte Carlo simulations are used, only a single model parameter value is varied and all other model parameter values will remain fixed. However, in order to provide more robust simulation results (i.e., a more robust model of electronic device performance), it would be advantageous if multiple model parameters were varied.

SUMMARY

In view of the foregoing disclosed herein are embodiments of a method, a system and a program storage device for simulating electronic device performance as a function of process variations. In these embodiments, functions of a primary model parameter (e.g., threshold voltage) for each of multiple secondary model parameters (e.g., carrier mobility, source/drain resistance, saturation velocity, etc.) across multiple different process conditions can be determined based on a relatively small number (e.g., two, three, four, etc.) of target sets of device characteristics. These functions can then be used to augment a simulator (i.e., a simulation environment) so that during subsequent simulations of the electronic device over a wide range of varying process conditions, a change in a value for the primary model parameter will automatically result in corresponding changes in values for the secondary model parameters. By augmenting the simulation environment in this manner, the disclosed embodiments efficiently provide more robust simulation results because only a limited number of target sets of values for device characteristics associated with a limited number of different process conditions are required for simulation operations over a wide range of varying process conditions and because, during simulation operations, multiple model parameters are varied simultaneously.

Specifically, disclosed herein are embodiments of a computer-implemented method for simulating electronic device performance as a function of process variations. The method can comprise accessing information and, particularly, accessing multiple first sets of values for characteristics of an electronic device (i.e., multiple target sets), where each first set (i.e., each target set) is associated with a different process condition, and also accessing a list of model parameters, where the list designates (e.g., designated by default or designated based on user input) a primary model parameter and multiple secondary model parameters. Multiple second sets of values for model parameters (i.e., multiple model parameter sets) can be created, where each second set (i.e., each model parameter set) corresponds to one of the first sets (i.e., to a given target set) such that the values for model parameters in a given second set reflect the values for characteristics in a corresponding first set. Then, the second sets can be analyzed to determine functions of the primary model parameter for each of the secondary model parameters (i.e., to determine mathematical relationships between the primary model parameter and each second model parameter). Once these functions are determined, a simulator (i.e., a simulation environment) can be augmented so that, during subsequent simulations of the electronic device at varying process conditions, a change in a value for the primary model parameter automatically results in corresponding changes in values for the secondary model parameters.

Also disclosed are embodiments of a system for simulating electronic device performance as a function of process variations. The system can comprise at least a memory and at least one processor in communication with the memory.

The memory can store information and, particularly, can store multiple first sets of values for characteristics of an electronic device (i.e., multiple target sets), where each first set (i.e., each target set) is associated with a different process condition. The memory can also store a list of model parameters, where the list designates (e.g., designates by default or designates based on user input) a primary model parameter and multiple secondary model parameters.

The processor(s) can comprise at least a model parameter values generator, a functions generator and an update tool. The model parameter values generator can create multiple second sets of values for model parameters (i.e., multiple model parameter sets), where each second set (i.e., each model parameter set) corresponds to one of the first sets (i.e., to a given target set) such that the values for model parameters in a given second set reflect the values for characteristics in a corresponding first set. The functions generator can analyze the second sets to determine functions of the primary model parameter for each of the secondary model parameters (i.e., to determine the mathematical relationships between the primary model parameter and each second model parameter). Finally, the update tool can augment a simulator (i.e., a simulation environment) so that, during subsequent simulations at varying process conditions, a change in a value for the primary model parameter automatically results in corresponding changes in values for the secondary model parameters.

Also disclosed herein are embodiments of a non-transitory program storage device. This program storage device can be readable by a computer and can tangibly embody a program of instructions executable by the computer to perform the above-described method.

BRIEF DESCRIPTION OF THE SEVERAL VIEWS OF THE DRAWINGS

The embodiments disclosed herein will be better understood from the following detailed description with reference to the drawings, which are not necessarily drawn to scale and in which.

DETAILED DESCRIPTION

Figure 1:
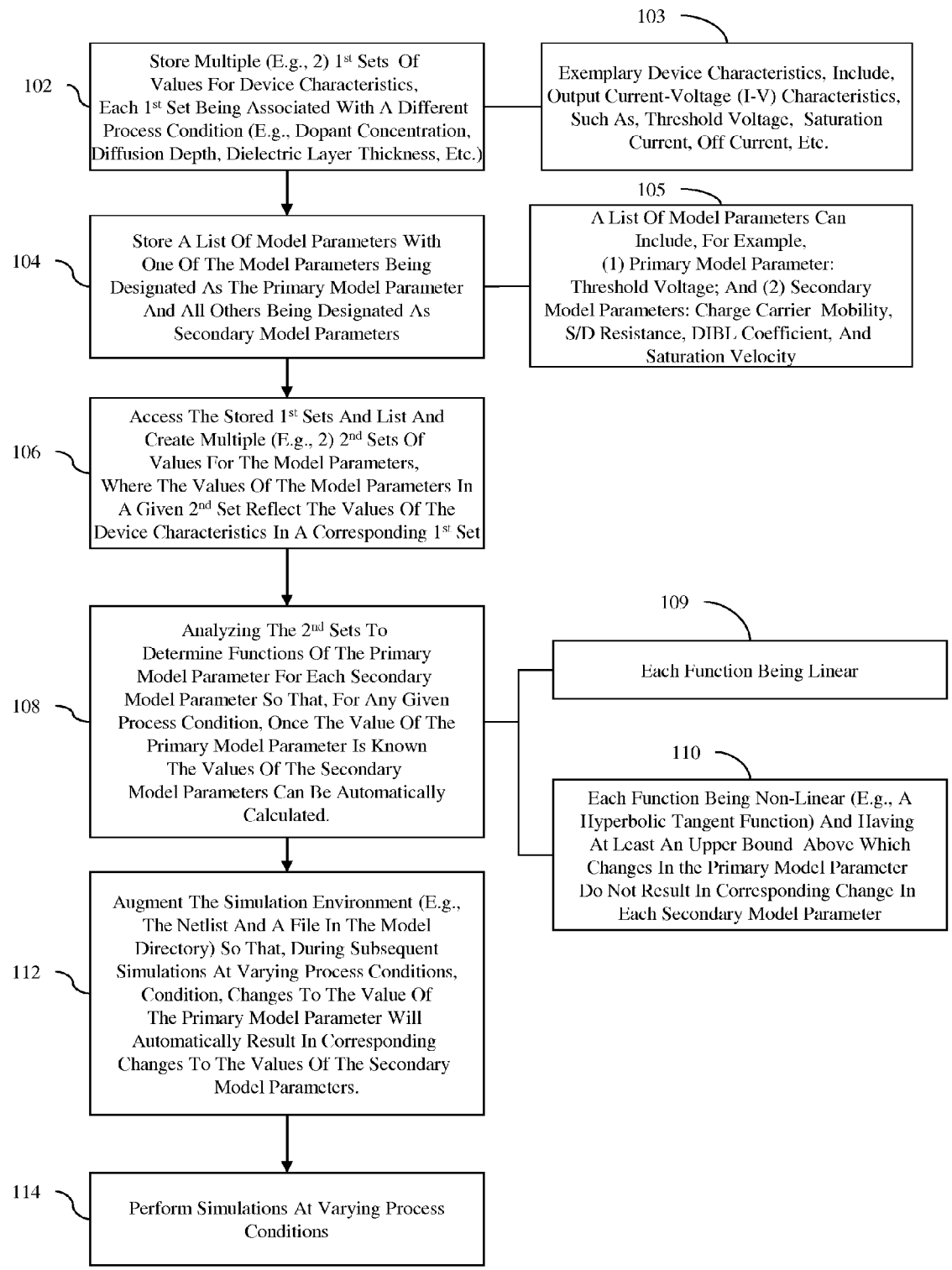
FIG. 1 is a flow diagram illustrating an embodiment of a method for simulating the performance of an electronic device.
Figure 2:
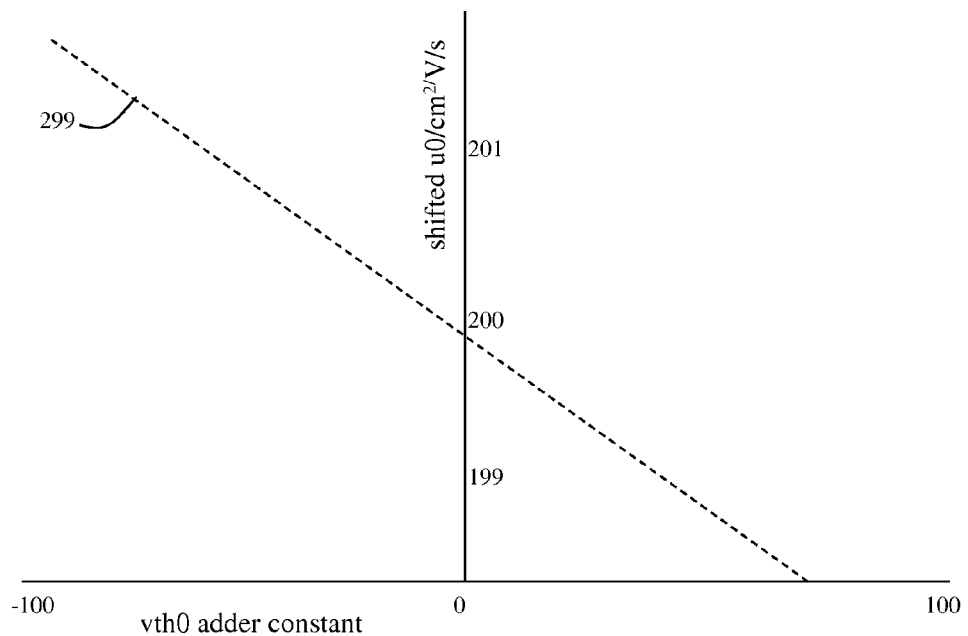
FIG. 2 is a graph illustrating a linear relationship between a shift in an adder constant associated with a primary model parameter and a corresponding shift in value of a secondary model parameter.

The disclosed embodiments and the various features and advantageous details thereof are explained in the detailed discussion below with reference to the accompanying drawings.

As mentioned above, electronic devices (e.g., single semiconductor devices, cells comprising multiple semiconductor devices, or entire integrated circuits) of the same design will often differ due to process variations (i.e., variations due to non-uniform conditions during processing). Types of process variations include, but are not limited to, variations in dopant concentration, variations in diffusion depth, variations in dielectric layer thickness, etc. Such process variations will in turn result in variations in electronic device performance.

In order to ensure that an electronic device will achieve a given performance target when manufactured, designers often simulate performance using a compact device model. Those skilled in the art will recognize that a compact device model is a set of equations that describe how the particular electronic device will perform as a function of various model parameter values. Many compact device models (e.g., Berkeley Short-Channel IGFET Model (BSIM), which refers to a family of metal oxide field effect transistor (MOSFET) models) support Monte Carlo (MC) simulations. Typically, when Monte Carlo simulations are used, only a single model parameter value is varied and all other model parameter values will remain fixed. However, in order to provide more robust simulation results (i.e., a more robust model of electronic device performance), it would be advantageous if multiple model parameters were varied.

In view of the foregoing disclosed herein are embodiments of a method, a system and a program storage device for simulating electronic device performance as a function of process variations. In these embodiments, functions of a primary model parameter (e.g., threshold voltage) for each of multiple secondary model parameters (e.g., carrier mobility, source/drain resistance, saturation velocity, etc.) across multiple different process conditions can be determined based on a relatively small number (e.g., two, three, four, etc.) of target sets of device characteristics. These functions can then be used to augment a simulator (i.e., a simulation environment) so that during subsequent simulations of the electronic device over a wide range of varying process conditions, a change in a value for the primary model parameter will automatically result in corresponding changes in values for the secondary model parameters. By augmenting the simulation environment in this manner, the disclosed embodiments efficiently provide more robust simulation results because only a limited number of target sets of values for device characteristics associated with a limited number of different process conditions are required for simulation operations over a wide range of varying process conditions and because, during simulation operations, multiple model parameters are varied simultaneously.

More particularly, referring to FIG. 1, disclosed herein are embodiments of a computer-implemented method for simulating electronic device performance as a function of process variations. It should be understood that as used herein, the term "electronic device" can comprise a single semiconductor device (e.g., a metal oxide semiconductor field effect transistor (MOSFET), a bipolar transistor (BJT), a heterojunction bipolar transistor (HBT), etc.), a cell incorporating multiple semiconductor devices (e.g., a static random access memory (SRAM) cell incorporating multiple MOSFETs) or an entire integrated circuit. Furthermore, the term "process variations" refer to variations that occur in the semiconductor fabrication process. These variations can include, for example, variations in dopant concentration (e.g., variations in S/D dopant concentration), variations in diffusion depth (e.g., variation in S/D dopant depth), variations in dielectric layer thickness (e.g., variation in gate dielectric layer thickness), etc.

The method can comprise storing (e.g., in memory) information (102)-(105).

This information can comprise, for example, multiple first sets of values for characteristics of an electronic device (i.e., multiple target sets), where each first set (i.e., each target set) is associated with a different process condition (102). Exemplary device characteristics can include, but are not limited to, various output current-voltage (I-V) characteristics, such as, threshold voltage (Vt), saturation current ($I_s$), off current ($I_{off}$), etc. (103). In one embodiment, only two first sets of values can be stored: one associated with a first process condition of a given type (e.g., a first S/D dopant concentration) and the other associated with a second but different process condition of the same type (e.g., a second S/D dopant concentration that is different from the first S/D dopant concentration). In other embodiments, more than two first sets of values can be stored.

The information can also comprise a list of model parameters (104). Specifically, the list of model parameters can comprise model parameters associated with a specific model (e.g., associated with a Berkeley Short-Channel IGFET Model (BSIM), a Simulation Program with Integrated Circuit Emphasis (SPICE) model, etc.). For example, the electronic device can comprise a MOSFET and the list of model parameters can comprise basic BSIM parameters such as threshold voltage (Vt), charge carrier mobility, drain-induced barrier lowering coefficient, saturation velocity, etc. (105). Furthermore, one of the model parameters on the list can be designated (e.g., by a user, by default, etc.) as a primary model parameter for simulation purposes (e.g., Vt) and all of the other model parameters on the list (e.g., charge carrier mobility, drain-induced barrier lowering coefficient, and saturation velocity) can be designated as secondary model parameters.

The method can further comprise accessing this information and, based on this information, creating multiple second sets of values for the model parameters on the list (i.e., multiple model parameter sets) (106). Specifically, each second set (i.e., each model parameter set) includes values for the primary and secondary model parameters and corresponds to one of the first sets (i.e., to a given target set) such that the values for model parameters in a given second set reflect the values for characteristics in a corresponding first set. Thus, if there are two first sets of values for device characteristics, there will be two corresponding second sets of values for the model parameters. Techniques for creating a set of values for model parameters based on a set of values for device characteristics are well-known in the art (e.g., see page 118 of the BSIM4.6.4 MOSFET Model User's Manual, Morshed et al., Department of Electrical Engineering and Computer Sciences, University of California, Berkeley, Calif. ©2009, http://www-device.eecs.berkeley.edu/~bsim3/BSIM4/BSIM464/BSIM464_Manual.pdf) and, thus, the details of such techniques are omitted from this specification in order to allow the reader to focus on the salient aspects of the disclosed embodiments.

Next, the method can comprise analyzing the second sets (i.e., the model parameter sets) to determine functions of the primary model parameter for each of the secondary model parameters (108). That is, the multiple second sets are analyzed to determine the mathematical relationships between the primary model parameter and each second model parameter.

For example, consider the case where: (1) the electronic device is a MOSFET; (2) the goal is to keep a given drain current to threshold voltage ($I_d$/Vt) relationship; (3) there are only two model parameter sets; and (3) within each model parameter set, the primary model parameter is Vt and the secondary model parameters are charge carrier mobility, drain-induced barrier lowering (DIBL) coefficient, and saturation velocity. At process 108, the model parameter values in the two model parameter sets can be analyzed in order to determine, for example, that a threshold voltage shift of a given percentage will result in the charge carrier mobility decreasing by a certain percentage, the drain-induced barrier lowering (DIBL) coefficient increasing by a certain percentage and the saturation velocity decreasing by a certain percentage and, thereby to determine functions of the primary model parameter (i.e. Vt) for each of the secondary model parameters (i.e., charge carrier mobility, drain-induced barrier lowering (DIBL) coefficient, and saturation velocity) in a way that preserves the $I_d$/Vt relationship.

For example, the following exemplary linear functions could be determined at process 108:

$$vth0_{new} = vth0_{nom} + \text{slope\_}vth0 * ind\_vtadd/s_1 \quad (1)$$

$$u0_{new} = u0_{nom} + \text{slope\_}u0 * ind\_vtadd/s_2 \quad (2)$$

$$vsat_{new} = vsat0_{nom} + \text{slope\_}vtsat0 * ind\_vtadd/s_3 \quad (3)$$

$$eta0_{new} = eta0_{nom} + \text{slope\_}eta0 * ind\_vtadd/s_4 \quad (4)$$

Figure 3:
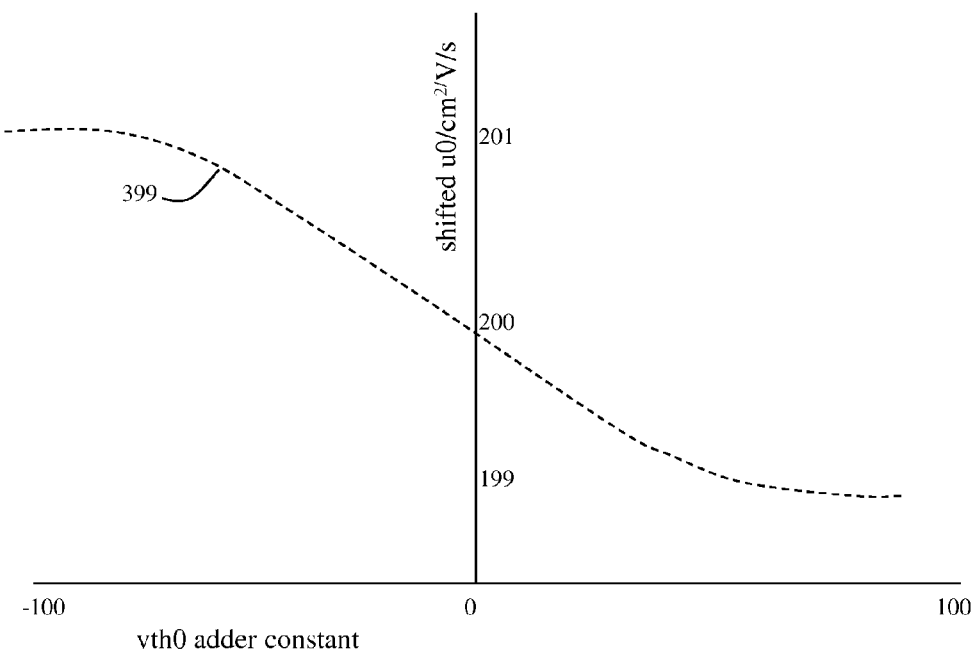
FIG. 3 is a graph illustrating a non-linear relationship between a shift in an adder constant associated with a primary model parameter and a corresponding shift in value of a secondary model parameter.

In equation (1), the vth0 adder constant (ind_vtadd) that will subsequently be used in equations 2-4 is determined. This adder constant (ind_vtadd) reflecting the change over the nominal value of the threshold voltage ($vth0_{nom}$), where the nominal value refers to the expected (i.e., typical) value if the device is formed by the manufacturing line according to the design. Once the vth0 adder constant is determined, it can then be used to automatically estimate the new values for the other model parameters (i.e., the new value for charge carrier mobility ($u0_{new}$), the new value for saturation velocity ($vsat_{new}$) and the new value for DIBL coefficient ($eta0_{new}$) over their respective nominal values ($u0_{nom}$, $vsat0_{nom}$, and $eta0_{nom}$), as shown in equations (2)-(4). It should be noted that the exemplary functions (1)-(4) determined at process 108 and discussed above are linear functions (109). That is, as illustrated by the line 299 in the graph of FIG. 3, the relationship between the shift in the primary model parameter (as represented in this case by the vth0 adder constant) and the resulting shift in each secondary model parameter (as represented in this case by charge carrier mobility) is linear. It should be noted that the variables $s_1$-$s_4$ represent scaling factors used to adjust the equations to the physical behavior of the material.

Those skilled in the art will, however, recognize that for very large shifts in the primary model parameter corresponding shift in the secondary model parameters may no longer be linear or may cease all together. That is, above a certain upper bound value or below a certain lower bound value, shifts in the primary model parameter may not result in corresponding shifts in the secondary model parameters. To compensate, the functions determined at process 108 can alternatively be non-linear functions (110). These non-linear functions can set upper and/or lower bounds outside of which changes in the primary model parameter do not result in corresponding changes in the secondary model parameters.

For example, the following exemplary non-linear functions could be determined at process 108:

$$vth0_{new} = vth0_{nom} + \text{slope\_}vth0 * ind\_vtadd/s_1 \quad (1)$$

$$u0_{new} = u0 + \text{slope\_}u0 * \tan h\{ind\_vtadd/s_2\} \quad (5)$$

$$vsat_{new} = vsat0_{nom} + \text{slope\_}vtsat0 * \tan h\{ind\_vtadd/s_3\} \quad (6)$$

$$eta0_{new} = eta0_{nom} + \text{slope\_}eta0 * \tan h\{ind\_vtadd/s_{14}\} \quad (7)$$

In this case, the first function is the same as in the previously described example. Furthermore, once the vth0 adder constant is determined, it can then be used to automatically predict the new values for the other model parameters (i.e., the new value for charge carrier mobility ($u0_{new}$), the new value for saturation velocity ($vsat_{new}$) and the new value for DIBL coefficient ($eta0_{new}$) over their respective nominal values ($u0_{nom}$, $vsat0_{nom}$, and $eta0_{nom}$), as shown in equations (5)-(7). However, in equations (5)-(7), the vth0 adder constant is further subject to an additional function (in this case a hyperbolic tangent function (tan h)), which sets both upper and lower bounds outside of which changes in the threshold voltage do not result in corresponding changes in the other model parameters. That is, as illustrated by the hyperbolic tangent curve 399 in the graph of FIG. 3, the relationship between the shift in the primary model parameter (as represented in this case by the vth0 adder constant) and the resulting shift in each secondary model parameter (as represented in this case by charge carrier mobility) is essentially linear in the center portion, but flattens out as the vth0 adder constant approaches either −100, representing a very small shift in Vt, or 100, representing a very high shift in Vt. Once these functions are determined at process 108, a simulator (i.e., a simulation environment) can be augmented to include new code so that, during subsequent simulations of the electronic device at varying process conditions (e.g., varying S/D dopant concentrations, varying dielectric layer thicknesses, varying diffusion depths, etc.), a change in a value for the primary model parameter automatically results in corresponding changes in values for the secondary model parameters (112). For example, the value of the mobility u0 may be given as the nominal mobility u0n plus a term that is comprised of a constant u0c times the vth0 adder vth0a. The equation that would be put in the include file would then be u0=u0n+ u0c*vth0a.

Finally, simulation operations can be performed at varying process conditions (e.g., varying S/D dopant concentrations, varying dielectric layer thicknesses, or varying diffusion depths) (114).

Figure 4:
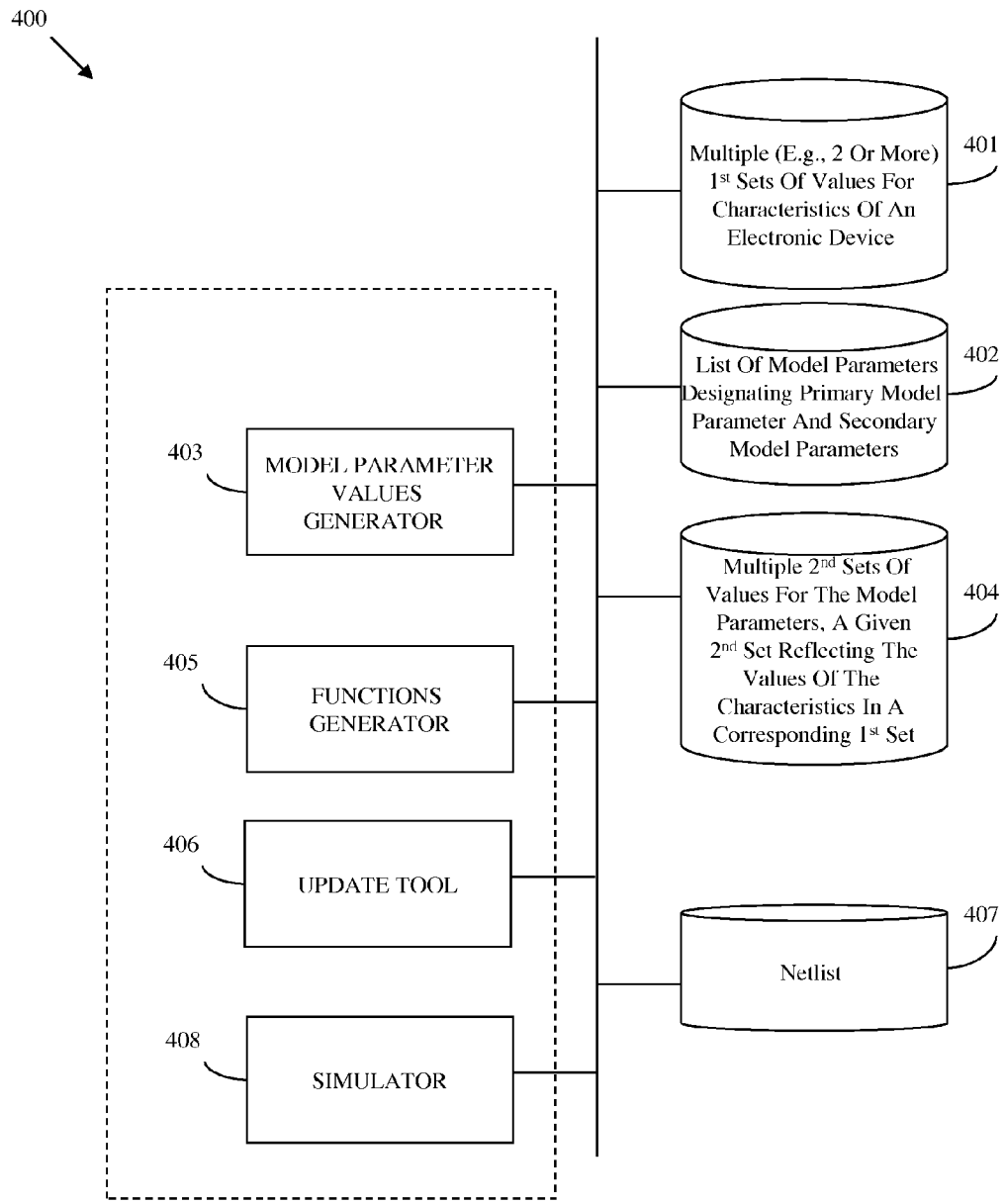
FIG. 4 is a schematic diagram illustrating an embodiment of a system for simulating the performance of an electronic device.

Also disclosed are embodiments of a system 400, as shown in FIG. 4, for simulating electronic device performance as a function of process variations. As mentioned above with regard to the method embodiment, it should be understood that as used herein, the term "electronic device" can comprise a single semiconductor device (e.g., a metal oxide semiconductor field effect transistor (MOSFET), a bipolar transistor (BJT), a heterojunction bipolar transistor (HBT), etc.), a cell incorporating multiple semiconductor devices (e.g., a static random access memory (SRAM) cell incorporating multiple MOSFETs) or an entire integrated circuit. Furthermore, the term "process variations" refer to variations that occur in the semiconductor fabrication process. These variations can include, for example, variations in dopant concentration (e.g., variations in S/D dopant concentration), variations in diffusion depth (e.g., variation in S/D dopant depth), variations in dielectric layer thickness (e.g., variation in gate dielectric layer thickness), etc.

Figure 5:
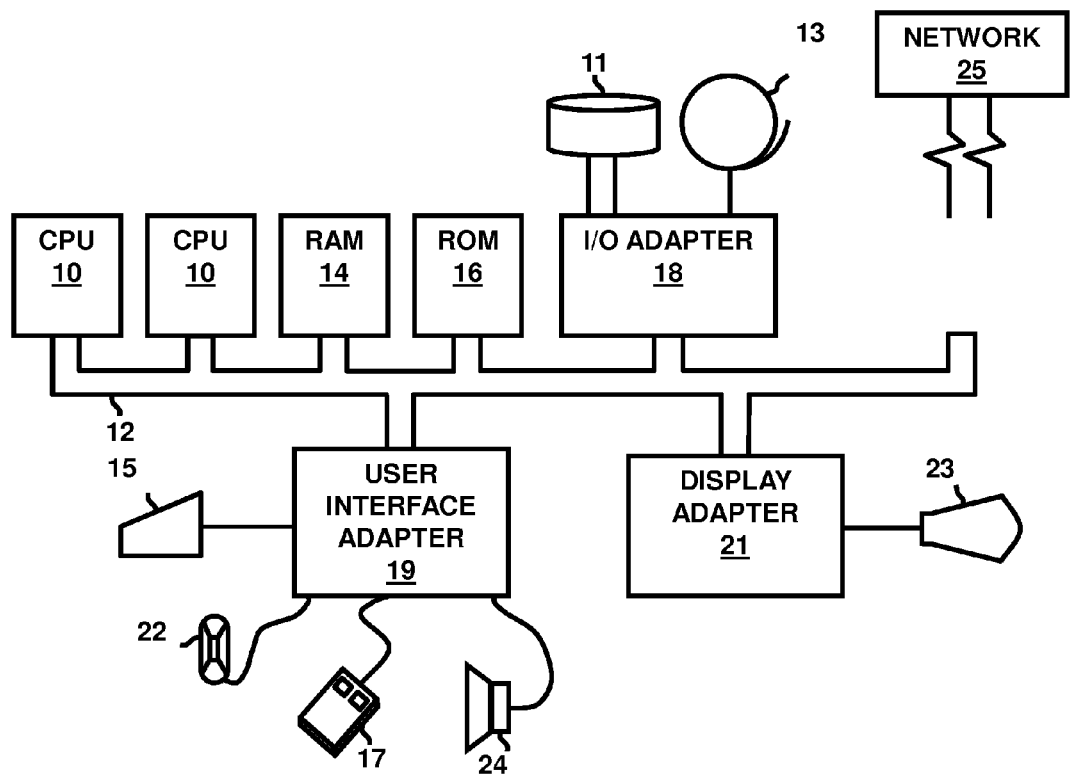
FIG. 5 is schematic diagram illustrating an exemplary hardware environment that can be used to implement the disclosed embodiments.

The system 400 can be implemented, for example, in a computer hardware environment such as that described in detail below and depicted in FIG. 5. Specifically, the system 400 embodiments can comprise at least one or more memory devices (e.g., 11, 13, 14 and 16) and one or more computer processing units (i.e., processors 10) in communication with the memory device(s), as shown in FIG. 5. The communication can be established directly via a system bus 12 or via a wired or wireless network 25.

The system memory can store (i.e., can be adapted to store, configured to store, etc.) information and, particularly, can store multiple first sets of values for characteristics of an electronic device (i.e., multiple target sets) 401, where each first set (i.e., each target set) is associated with a different process condition. Exemplary device characteristics can include, but are not limited to, various output current-voltage (I-V) characteristics, such as, threshold voltage (Vt), saturation current ($I_s$), off current ($I_{off}$), etc. (103). In one embodiment, only two first sets of values can be stored: one associated with a first process condition of a given type (e.g., a first S/D dopant concentration) and the other associated with a second but different process condition of the same type (e.g., a second S/D dopant concentration that is different from the first S/D dopant concentration). In other embodiments, more than two first sets of values can be stored.

The system memory can also store a list of model parameters 402, where the list designates (e.g., designates by default or designates based on user input) a primary model parameter and multiple secondary model parameters. Specifically, the list of model parameters can comprise model parameters associated with a specific model (e.g., associated with a Berkeley Short-Channel IGFET Model (BSIM), a Simulation Program with Integrated Circuit Emphasis (SPICE) model, etc.). For example, the electronic device can comprise a MOSFET and the list of model parameters can comprise basic BSIM parameters such as threshold voltage (Vt), charge carrier mobility, drain-induced barrier lowering coefficient, saturation velocity, etc. (105). Furthermore, one of the model parameters on the list can be designated (e.g., by a user, by default, etc.) as a primary model parameter for simulation purposes (e.g., Vt) and all of the other model parameters on the list (e.g., charge carrier mobility, drain-induced barrier lowering coefficient, and saturation velocity) can be designated as secondary model parameters.

The processor(s) can comprise at least a model parameter values generator 403, a functions generator 405, an update tool 406, and a simulator 408.

The model parameter values generator 403 can access (i.e., can be adapted to access, configured to access, programmed to access, etc.) the stored information (i.e., the target sets of values for device characteristics 401 and the list of model parameters 402). The model parameter values generator 403 can further create (i.e., can be adapted to create, configured to create, programmed to create, etc.) and store in memory multiple second sets of values for model parameters (i.e., multiple model parameter sets) 404. Specifically, each second set (i.e., each model parameter set) includes values for the primary and secondary model parameters and corresponds to one of the first sets (i.e., to a given target set) such that the values for model parameters in a given second set reflect the values for characteristics in a corresponding first set. Thus, if there are two first sets of values for device characteristics, there will be two corresponding second sets of values for the model parameters. Model parameter values generators for creating a set of values for model parameters based on a set of values for device characteristics are well-known in the art and, thus, the details of such techniques are omitted from this specification in order to allow the reader to focus on the salient aspects of the disclosed embodiments.

The functions generator 405 can analyze (i.e., can be adapted to analyze, configured to analyze, programmed to analyze, etc.) the second sets 404 to determine functions of the primary model parameter for each of the secondary model parameters. That is, the multiple second sets are analyzed by the functions generator 405 to determine the mathematical relationships between the primary model parameter and each secondary model parameter.

For example, consider the case where: (1) the electronic device is a MOSFET; (2) the goal is to keep a given drain current to threshold voltage ($I_d$/Vt) relationship; (3) there are only two model parameter sets; and (3) within each model parameter set, the primary model parameter is Vt and the secondary model parameters are charge carrier mobility, drain-induced barrier lowering (DIBL) coefficient, and saturation velocity. The functions generator 405 can analyze the model parameter values in the two model parameter sets in order to determine, for example, that a threshold voltage shift of a given percentage will result in the charge carrier mobility decreasing by a certain percentage, the drain-induced barrier lowering (DIBL) coefficient increasing by a certain percentage and the saturation velocity decreasing by a certain percentage and, thereby to determine functions of the primary model parameter (i.e. Vt) for each of the secondary model parameters (i.e., charge carrier mobility, drain-induced barrier lowering (DIBL) coefficient, and saturation velocity) in a way that preserves the $I_d$/Vt relationship.

For example, the functions generator 405 could determine the following exemplary linear functions:

$$vth0_{new}=vth0_{nom}+\text{slope\_}vth0^*ind\_vtadd/s_1 \quad (1)$$

$$u0_{new}=u0_{nom}+\text{slope\_}u0^*ind\_vtadd/s_2 \quad (2)$$

$$vsat_{new}=vsat0_{nom}+\text{slope\_}vtsat0^*ind\_vtadd/s_3 \quad (3)$$

$$eta0_{new}=eta0_{nom}+\text{slope\_}eta0^*ind\_vtadd/s_4 \quad (4)$$

In equation (1), the vth0 adder constant (ind_vtadd) that will subsequently be used in equations 2-4 is determined. This adder constant (ind_vtadd) reflecting the change over the nominal value of the threshold voltage ($vth0_{nom}$), where the nominal value refers to the expected (i.e., typical) value if the device is formed by the manufacturing line according to the design. Once the vth0 adder constant is determined, it can then be used to automatically estimate the new values for the other model parameters (i.e., the new value for charge carrier mobility ($u0_{new}$), the new value for saturation velocity ($vsat_{new}$) and the new value for DIBL coefficient ($eta0_{new}$) over their respective nominal values ($u0_{nom}$, $vsat0_{nom}$, and eta0$_{nom}$), as shown in equations (2)-(4). It should be noted that the exemplary functions (1)-(4) determined by the functions generator 405 and discussed above are linear functions. That is, as illustrated by the line 299 in the graph of FIG. 3, the relationship between the shift in the primary model parameter (as represented in this case by the vth0 adder constant) and the resulting shift in each secondary model parameter (as represented in this case by charge carrier mobility) is linear. It should be noted that the variables $s_1$-$s_4$ represent scaling factors used to adjust the equations to the physical behavior of the material.

Those skilled in the art will, however, recognize that for very large shifts in the primary model parameter corresponding shift in the secondary model parameters may no longer be linear or may cease all together. That is, above a certain upper bound value or below a certain lower bound value, shifts in the primary model parameter may not result in corresponding shifts in the secondary model parameters. To compensate, the functions determined by the functions generator 405 can alternatively be non-linear functions. These non-linear functions can set upper and/or lower bounds outside of which changes in the primary model parameter do not result in corresponding changes in the secondary model parameters.

For example, the functions generator 405 could determine the following exemplary non-linear functions:

$$vth0_{new} = vth0_{nom} + \text{slope\_}vth0 * ind\_vtadd/s_1 \quad (1)$$

$$u0_{new} = u0 + \text{slope\_}u0 * \tan h\{ind\_vtadd/s_2\} \quad (5)$$

$$vsat_{new} = vsat0_{nom} + \text{slope\_}vtsat0 * \tan h\{ind\_vtadd/s_3\} \quad (6)$$

$$eta0_{new} = eta0_{nom} + \text{slope\_}eta0 * \tan h\{ind\_vtadd/s_{14}\} \quad (7)$$

In this case, the first function is the same as in the previously described example. Furthermore, once the vth0 adder constant is determined, it can then be used to automatically predict the new values for the other model parameters (i.e., the new value for charge carrier mobility (u0$_{new}$), the new value for saturation velocity (vsat$_{new}$) and the new value for DIBL coefficient (eta0$_{new}$) over their respective nominal values (u0$_{nom}$, vsat0$_{nom}$, and eta0$_{nom}$), as shown in equations (5)-(7). However, in equations (5)-(7), the vth0 adder constant is further subject to an additional function (in this case a hyperbolic tangent function (tan h)), which sets both upper and lower bounds outside of which changes in the threshold voltage do not result in corresponding changes in the other model parameters. That is, as illustrated by the hyperbolic tangent curve 399 in the graph of FIG. 3, the relationship between the shift in the primary model parameter (as represented in this case by the vth0 adder constant) and the resulting shift in each secondary model parameter (as represented in this case by charge carrier mobility) is essentially linear in the center portion, but flattens out as the vth0 adder constant approaches either −100, representing a very small shift in Vt, or 100, representing a very high shift in Vt.

Once these functions are determined by the functions generator 405, the update tool 406 can augment (i.e., can be adapted to augment, configured to augment, programmed to augment, etc.) the simulator 408 (i.e., a simulation environment) to include new code so that, during subsequent simulations of the electronic device at varying process conditions (e.g., varying S/D dopant concentrations, varying dielectric layer thicknesses, varying diffusion depths, etc.), a change in a value for the primary model parameter automatically results in corresponding changes in values for the secondary model parameters. To accomplish this, the update tool 406 can, for example, generate an include file (e.g., include 'slopes.inc') that contains the functions and can input the include file so that it is referenced in the netlist 407 for the electronic device. For example, the value of the mobility u0 may be given as the nominal mobility u0n plus a term that is comprised of a constant u0c times the vth0 adder vth0a. The equation that would be put in the include file would then be u0=u0n+u0c*vth0a.

Finally, the simulator 408 can perform (i.e., can be adapted to perform, configured to perform, programmed to perform, etc.) simulation operations at varying process conditions (e.g., varying S/D dopant concentrations, varying dielectric layer thicknesses, or varying diffusion depths). Simulators are well-known in the art and, thus, the details of such simulators are omitted from this specification in order to allow the reader to focus on the salient aspects of the disclosed embodiments.

As described above and illustrated in FIG. 4, the system components (e.g., model parameter values generator 403, functions generator 405, update tool 406, simulator 408, etc.) can be implemented by discrete units (e.g., discrete computer systems or discrete computer processing units (i.e., discrete processors)). However, alternatively, any two or more of these components can be implemented by a single unit (e.g., by a single computer system or by a single computer processing unit (i.e., a single processor)). Similarly, as described above and illustrated in FIG. 4, the stored information (e.g., the Multiple 1$^{st}$ Sets Of Values For Device Characteristics 401, the List of Model Parameters 402, the Multiple 2$^{nd}$ Sets Of Values For The Model Parameters 404, etc.) can be stored by discrete memories. However, alternatively, any of this stored information can be stored on the same memory.

Also disclosed herein are embodiments of a non-transitory program storage device. This storage device can be readable by a computer and can tangibly embody a program of instructions executable by the computer to perform the above described method embodiments. Specifically, as will be appreciated by one skilled in the art, aspects of the disclosed embodiments may be embodied as a system, method or computer program product. Accordingly, aspects of the disclosed embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosed embodiments may take the form of a computer program product embodied in one or more computer readable medium(s) having computer readable program code embodied thereon.

Any combination of one or more computer readable medium(s) may be utilized. The computer readable medium may be a computer readable storage medium or a computer readable signal medium. The computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible storage device that can contain, or store a program for use by or in connection with an instruction execution system, apparatus, or device. The computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Furthermore, program code for carrying out operations for aspects of the embodiments disclosed herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed method, system and computer program product (i.e., program storage device) embodiments are described above with reference to flowchart illustrations and/or block diagrams. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As mentioned above, the representative hardware environment for practicing the disclosed method, system and program storage device embodiments is depicted in FIG. 5. This schematic drawing illustrates a hardware configuration of an information handling/computer system in accordance with the embodiments disclosed herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments disclosed herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of the disclosed systems, method and computer program product (i.e., program storage device) embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be understood that the terminology used herein is for the purpose of describing the disclosed embodiments only and is not intended to be limiting. As used herein, the singular forms "a", "an" and "the" are intended to include the plural forms as well, unless the context clearly indicates otherwise. It will be further understood that the terms "comprises", "comprising", "includes" and/or "including", when used in this specification, specify the presence of stated features, integers, steps, operations, elements, and/or components, but do not preclude the presence or addition of one or more other features, integers, steps, operations, elements, components, and/or groups thereof. It should further be understood that the corresponding structures, materials, acts, and equivalents of all means or step plus function elements in the claims below are intended to include any structure, material, or act for performing the function in combination with other claimed elements as specifically claimed.

Finally, it should be understood that the disclosed embodiments have been presented for purposes of illustration and description, but are not intended to be exhaustive or limiting in the form disclosed. Many modifications and variations to the disclosed embodiments will be apparent to those of ordinary skill in the art without departing from the scope and spirit thereof. For example, for illustration purposes, the embodiments were described above with respect to a MOSFET. The embodiments were chosen and described in order to best explain the disclosed principles, the practical application of those principles, and to enable others of ordinary skill in the art to understand the various embodiments with various modifications as are suited to the particular use contemplated. However, it should be understood that, the embodiments equally pertain to other types of electronic devices, including other types of single semiconductor devices (e.g., a bipolar transistor, a diode, a capacitor, etc.), cells comprising multiple semiconductor devices (e.g., static random access memory (SRAM) cells, dynamic random access memory (DRAM) cells, etc.) or entire circuits or integrated circuit chips.

Therefore, disclosed above are embodiments of a method, a system and a program storage device for simulating electronic device performance as a function of process variations. In these embodiments, functions of a primary model parameter (e.g., threshold voltage) for each of multiple secondary model parameters (e.g., carrier mobility, source/drain resistance, saturation velocity, etc.) across multiple different process conditions can be determined based on a relatively small number (e.g., two, three, four, etc.) of target sets of device characteristics. These functions can then be used to augment a simulator (i.e., a simulation environment) so that during subsequent simulations of the electronic device over a wide range of varying process conditions, a change in a value for the primary model parameter will automatically result in corresponding changes in values for the secondary model parameters. By augmenting the simulation environment in this manner, the disclosed embodiments efficiently provide more robust simulation results (i.e., a more robust model of electronic device performance) because only a limited number (e.g., 2) of target sets of values for device characteristics associated with a limited number (e.g., 2) of different process conditions are required for simulation operations over a wide range of varying process conditions and because, during simulation operations, multiple model parameters are varied simultaneously.

What is claimed is:

1. A method comprising:
   accessing, by a computer, information, said information comprising:
      multiple first sets of values for characteristics of an electronic device, said multiple first sets being associated with multiple different process conditions that occur in fabrication of said electronic device, each first set being associated with a different one of said multiple different process conditions; and
      a list of model parameters associated with a specific model for said electronic device, said list designating a primary model parameter and multiple secondary model parameters;
   creating, by said computer, multiple second sets of values for said model parameters, each second set corresponding to and being based on one of said first sets such that said values for said model parameters associated with said specific model for said electronic device in a given second set reflect said values for said characteristics of said electronic device in a corresponding first set;
   analyzing, by said computer, said second sets to determine functions of said primary model parameter for each of said secondary model parameters; and
   augmenting, by said computer based on said functions, a simulator so that, during subsequent simulations of said electronic device at varying process conditions, a change in a value for said primary model parameter automatically results in corresponding changes in values for said secondary model parameters.

2. The method of claim 1, said functions comprising linear functions.

3. The method of claim 1, said functions comprising non-linear functions having at least an upper bound above which said change in said primary model parameter will not result in said corresponding changes said secondary model parameters.

4. The method of claim 3, said non-linear functions comprising hyperbolic tangent functions.

5. The method of claim 1, said characteristics comprising at least threshold voltage, saturation current and off current.

6. The method of claim 1, said model parameters comprising at least threshold voltage, charge carrier mobility, source/drain resistance, drain-induced barrier lowering coefficient, and saturation velocity.

7. The method of claim 6, said threshold voltage being designated as said primary model parameter and said charge carrier mobility, said drain-induced barrier lowering coefficient, and said saturation velocity being designated as said secondary model parameters.

8. The method of claim 1, said varying process conditions comprising any one of varying dopant concentrations, varying dielectric layer thicknesses, and varying diffusion depths.

9. The method of claim 1, said electronic device comprising any of a single semiconductor device; a cell comprising multiple semiconductor devices; and an integrated circuit.

10. A system comprising:
    a memory storing information, said information comprising:
       multiple first sets of values for characteristics of an electronic device, said multiple first sets being associated with multiple different process conditions that occur in fabrication of said electronic device, each first set being associated with a different one of said multiple different process conditions; and
       a list of model parameters associated with a specific model for said electronic device, said list designating a primary model parameter and multiple secondary model parameters; and,
    at least one processor in communication with said memory, said at least one processor comprising:
       a model parameter values generator creating multiple second sets of values for said model parameters, each second set corresponding to and being based on one of said first sets such that said values for said model parameters in a given second set reflect said values for said characteristics in a corresponding first set;
       a functions generator analyzing said second sets to determine functions of said primary model parameter for each of said secondary model parameters; and
       an update tool augmenting a simulator based on said functions so that, during subsequent simulations at varying process conditions, a change in a value for said primary model parameter automatically results in corresponding changes in values for said secondary model parameters.

11. The system of claim 10, said functions comprising linear functions.

12. The system of claim 10, said functions comprising non-linear functions having at least an upper bound above which said change in said primary model parameter will not result in said corresponding changes said secondary model parameters.

13. The system of claim 12, said non-linear functions comprising hyperbolic tangent functions.

14. The system of claim 10, said characteristics comprising at least threshold voltage, saturation current and off current.

15. The system of claim 10, said model parameters comprising at least threshold voltage, charge carrier mobility, source/drain resistance, drain-induced barrier lowering coefficient, and saturation velocity.

16. The system of claim 15, said threshold voltage being designated as said primary model parameter and said charge carrier mobility, said drain-induced barrier lowering coefficient, and said saturation velocity being designated as said secondary model parameters.

17. The system of claim 10, said varying process conditions comprising any one of varying dopant concentrations, varying dielectric layer thicknesses, and varying diffusion depths.

18. The system of claim 10, said electronic device comprising any of a single semiconductor device; a cell comprising multiple semiconductor devices; and an integrated circuit.

19. A tangible program storage device readable by a computer and storing a program of instructions executable by said computer to perform a method, said method comprising:
  accessing information, said information comprising:
    multiple first sets of values for characteristics of an electronic device, said multiple first sets being associated with multiple different process conditions that occur in fabrication of said electronic device, each first set being associated with a different one of said multiple different process conditions; and
    a list of model parameters associated with a specific model for said electronic device, said list designating a primary model parameter and multiple secondary model parameters;
  creating multiple second sets of values for said model parameters, each second set corresponding to and being based on one of said first sets such that said values for said model parameters in a given second set reflect said values for said characteristics of said electronic device in a corresponding first set;
  analyzing said second sets to determine functions of said primary model parameter for each of said secondary model parameters; and
  augmenting a simulator based on said functions so that, during subsequent simulations of said electronic device at varying process conditions, a change in a value for said primary model parameter automatically results in corresponding changes in values for said secondary model parameters.

20. The program storage device of claim 19, said functions comprising one of linear functions and non-linear functions, said non-linear functions having at least an upper bound above which said change in said primary model parameter will not result in said corresponding changes said secondary model parameters.

* * * * *